US012634012B2

(12) United States Patent
Hsieh et al.

(10) Patent No.: US 12,634,012 B2
(45) Date of Patent: May 19, 2026

(54) COMMUNICATION DEVICE AND COMMUNICATION DEVICE METHOD

(71) Applicant: Gemtek Technology Co., Ltd., Hsinchu (TW)

(72) Inventors: Chang-Yuan Hsieh, Hsinchu (TW); Yu-Sheng Lin, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 274 days.

(21) Appl. No.: 18/650,117

(22) Filed: Apr. 30, 2024

(65) Prior Publication Data

US 2025/0038856 A1      Jan. 30, 2025

Related U.S. Application Data

(60) Provisional application No. 63/528,920, filed on Jul. 26, 2023.

(30) Foreign Application Priority Data

Dec. 27, 2023     (TW) ................................. 112214223

(51) Int. Cl.
*H04B 10/50*          (2013.01)
*H04B 10/508*       (2013.01)

(52) U.S. Cl.
CPC ......... *H04B 10/503* (2013.01); *H04B 10/508* (2013.01)

(58) Field of Classification Search
CPC ............................ H04B 10/503; H04B 10/508
USPC .......................................................... 398/204
See application file for complete search history.

(56) References Cited

U.S. PATENT DOCUMENTS

| | | | | |
|---|---|---|---|---|
| 2013/0156417 A1* | 6/2013 | Chou | ..................... | H04B 10/40 |
| | | | | 398/5 |
| 2015/0295385 A1* | 10/2015 | Wang | ................... | H04B 10/506 |
| | | | | 398/79 |
| 2017/0012701 A1* | 1/2017 | Yao | ...................... | H04B 10/503 |
| 2018/0062746 A1* | 3/2018 | Ohteru | ................ | H04B 10/038 |
| 2024/0107208 A1* | 3/2024 | Xiong | ................. | H04B 10/272 |
| 2025/0016482 A1* | 1/2025 | Dowds | ............... | H04Q 11/0067 |

* cited by examiner

*Primary Examiner* — Dalzid E Singh
(74) *Attorney, Agent, or Firm* — JCIPRNET

(57)          ABSTRACT

A communication device includes a first laser driver, a second laser driver, a light emitting and receiving component, and a processor. The light emitting and receiving component is connected to a passive optical network to send and/or receive an optical signal. The light emitting and receiving component converts the optical signal into a first electrical signal and outputs the first electrical signal to one of the first laser driver and the second laser driver. One of the first laser driver and the second laser driver converts the first electrical signal into a second electrical signal, and outputs the second electrical signal to the processor. The processor disables another one of the first laser driver and the second laser driver.

20 Claims, 4 Drawing Sheets

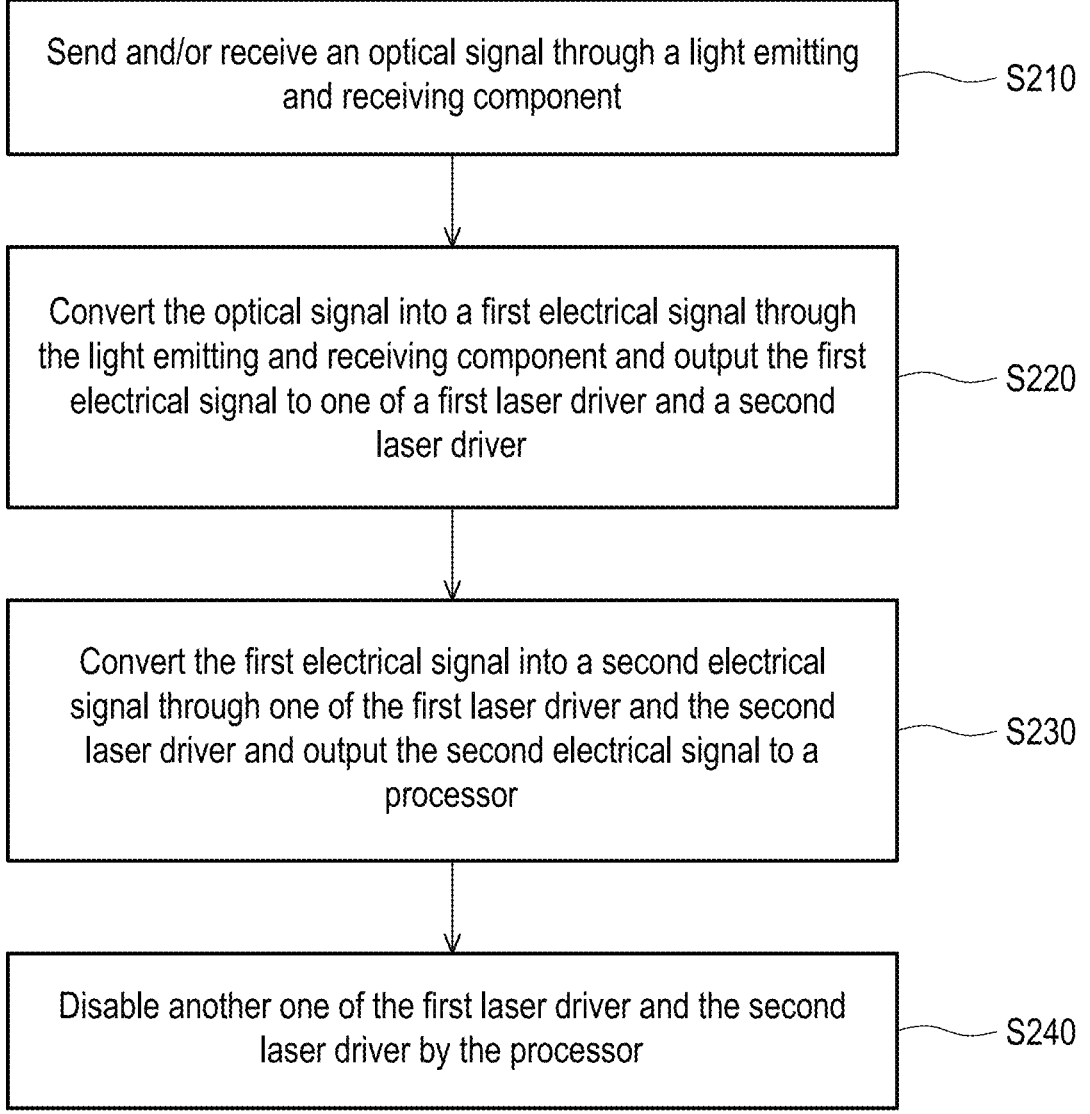

Send and/or receive an optical signal through a light emitting and receiving component — S210

Convert the optical signal into a first electrical signal through the light emitting and receiving component and output the first electrical signal to one of a first laser driver and a second laser driver — S220

Convert the first electrical signal into a second electrical signal through one of the first laser driver and the second laser driver and output the second electrical signal to a processor — S230

Disable another one of the first laser driver and the second laser driver by the processor — S240

FIG. 2

COMMUNICATION DEVICE AND COMMUNICATION DEVICE METHOD

CROSS-REFERENCE TO RELATED APPLICATION

This application claims the priority benefit of U.S. provisional application Ser. No. 63/528,920, filed on Jul. 26, 2023, and Taiwan application serial no. 112214223, filed on Dec. 27, 2023. The entirety of each of the above-mentioned patent applications is hereby incorporated by reference herein and made a part of this specification.

BACKGROUND

Technical Field

The disclosure relates to a device, and in particular to a communication device and a communication device method.

Description of Related Art

Conventional optical fiber communication equipment cannot be applied to passive optical network (PON) in different wavebands at the same time, for example, the equipment may be a Gigabit PON (GPON) or a 10 Gigabit Symmetric PON (XGSPON). In other words, when users want to connect to passive optical network in different wavebands, switching to multiple communication devices is needed, which is quite inconvenient.

SUMMARY

The disclosure provides a communication device and a communication device method adapted to establish communication with a passive optical network (PON) in multiple wavebands.

The communication device according to the disclosure includes a first laser driver, a second laser driver, a light emitting and receiving component, and a processor. The light emitting and receiving component is connected to the passive optical network to send and/or receive an optical signal and is electrically connected to the first laser driver and the second laser driver. The processor is electrically connected to the first laser driver and the second laser driver. The light emitting and receiving component converts the optical signal into the first electrical signal and outputs the first electrical signal to one of the first laser driver and the second laser driver. One of the first laser driver and the second laser driver converts the first electrical signal into the second electrical signal and outputs the second electrical signal to the processor. The processor disables another one of the first laser driver or the second laser driver.

The communication device method according to the disclosure includes steps as follows: sending and/or receiving an optical signal from the passive optical network through the light emitting and receiving component; converting the optical signal into the first electrical signal through the light emitting and receiving component and outputting the first electrical signal to one of the first laser driver and the second laser driver; converting the first electrical signal to the second electrical signal through one of the first laser driver and the second laser driver and outputting the second electrical signal to the processor; and disabling another one of the first laser driver and the second laser driver through the processor.

Based on the above, the communication device and the communication device method according to the disclosure can automatically select the first laser driver or the second laser driver according to the wavelength of the received or sent optical signal to communicate with the passive optical network applied to different wavebands.

In order to make the above-mentioned features and advantages of the disclosure more comprehensible, embodiments are specifically mentioned below and described in detail with reference to the attached drawings.

BRIEF DESCRIPTION OF THE DRAWINGS

FIG. 2 is a flow chart of a communication device method according to an embodiment of the disclosure.

DESCRIPTION OF THE EMBODIMENTS

Figure 1:
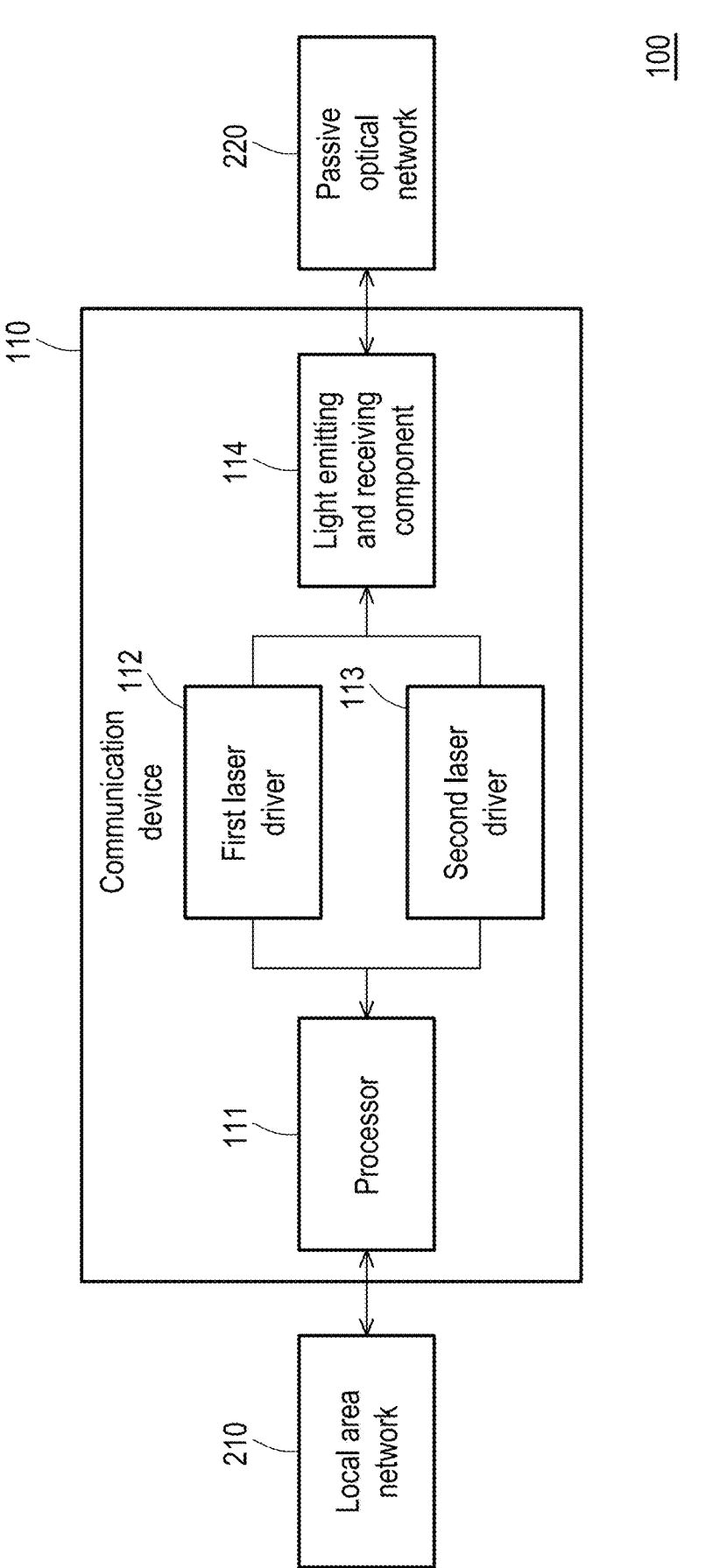
FIG. 1 is a schematic diagram of a communication device according to an embodiment of the disclosure.

In order to make the content of the disclosure more comprehensible, embodiments are specifically cited below as examples according to which the disclosure can be implemented. In addition, wherever possible, elements/components/steps with the same reference numerals in the drawings and embodiments represent the same or similar parts.

FIG. 1 is a schematic diagram of a communication device according to an embodiment of the disclosure. Referring to FIG. 1, a communication system 100 includes a communication device 110, a local area network (LAN) 210, and a passive optical network (PON) 220. The communication device 110 is connected (or coupled) to the local area network 210 and the passive optical network 220. In this embodiment, the communication device 110 includes a processor 111, a first laser driver 112, a second laser driver 113, and a light emitting and receiving component 114. The processor 111 is electrically connected to the first laser driver 112 and the second laser driver 113 and is connected to the local area network 210. The light emitting and receiving component 114 is electrically connected to the first laser driver 112 and the second laser driver 113 and is connected to the passive optical network 220.

In this embodiment, the processor 111 may be, for example, a System on a Chip (SoC), but the disclosure is not limited thereto. The light emitting and receiving component 114 may be, for example, a Bi-directional Optical Sub-Assembly (BOSA). The light emitting and receiving component 114 may be used to send and/or receive uplink optical signals and downlink optical signals of different wavebands, and the processor 111 may be used to send and/or receive different uplink electrical signals and downlink electrical signals accordingly.

Specifically, in this embodiment, the first laser driver 112 may receive the first uplink electrical signal from the local area network 210 through the processor 111 and convert the first uplink electrical signal into the first uplink optical signal through the light emitting and receiving component 114 to be sent to the passive optical network 220 through the light emitting and receiving component 114. The light emitting and receiving component 114 may receive the first downlink optical signal from the passive optical network 220 and convert the first downlink optical signal into the first downlink electrical signal. The first laser driver 112 may receive the first downlink electrical signal from the light emitting and receiving component 114 and send to the local area network 210 through the processor 111.

Or, in an embodiment, the second laser driver 113 may receive the second uplink electrical signal from the local area network 210 through the processor 111 and convert the second uplink electrical signal into the second uplink optical signal through the light emitting and receiving component 114 to be sent to the passive optical network 220 through the light emitting and receiving component 114. The light emitting and receiving component 114 may receive the second downlink optical signal from the passive optical network 220 and convert the second downlink optical signal into the second downlink electrical signal. The second laser driver 113 may receive the second downlink electrical signal from the light emitting and receiving component 114 and send to the local area network 210 through the processor 111.

In this embodiment, the first uplink optical signal and the second uplink optical signal have different wavelengths, and the first downlink optical signal and the second downlink optical signal have different wavelengths. For example, the passive optical network 220 may be a Gigabit PON (GPON) or a 10 Gigabit Symmetric PON (XGSPON), but the disclosure is not limited thereto. XGSPON may, for example, transmit the first uplink optical signal and the first downlink optical signal. The first uplink optical signal may, for example, have a wavelength of 1270 nm. The first downlink optical signal may, for example, have a wavelength of 1577 nm. GPON may, for example, transmit the second uplink optical signal and the second downlink optical signal. The second uplink optical signal may, for example, have a wavelength of 1310 nm. The second downlink optical signal may, for example, have a wavelength of 1490 nm.

FIG. 2 is a flow chart of a communication device method according to an embodiment of the disclosure. Referring to FIG. 1 and FIG. 2, the communication device 110 in FIG. 1 may perform the following steps S210 to S240 to implement communication operations. In step S210, the communication device 110 may send and/or receive optical signals through the light emitting and receiving component 114. In step S220, the communication device 110 may convert the optical signal into the first electrical signal through the light emitting and receiving component 114 and output the first electrical signal to one of the first laser driver 112 and the second laser driver 113. In step S230, the communication device 110 may convert the first electrical signal into the second electrical signal through one of the first laser driver 112 and the second laser driver 113 and output the second electrical signal to the processor 111. In step S240, the processor 111 may disable another one of the first laser driver 112 and the second laser driver 113. In this embodiment, the processor 111 may receive the loss-of-signal signal sent by one of the first laser driver 112 and the second laser driver 113 to disable another one of the first laser driver 112 and the second laser driver 113.

For example, when the passive optical network 220 is XGSPON, the light emitting and receiving component 114 may receive the first downlink optical signal from the passive optical network 220, and the light emitting and receiving component 114 may send the first uplink optical signal to the passive optical network 220. Further, the light emitting and receiving component 114 may receive the first uplink electrical signal from the first laser driver 112, and the light emitting and receiving component 114 may send the first downlink electrical signal to the first laser diode 112. When the passive optical network 220 is GPON, the light emitting and receiving component 114 may receive the second downlink optical signal from the passive optical network 220, and the light emitting and receiving component 114 may send the second uplink optical signal to the passive optical network 220. Further, the light emitting and receiving component 114 may receive the second uplink electrical signal from the second laser driver 113, and the light emitting and receiving component 114 may send the second downlink electrical signal to the second laser driver 113. In other words, the communication device 110 according to this embodiment can effectively support the communication architecture of two types (such as GPON and XGSPON) of the passive optical network 220.

Figure 3:
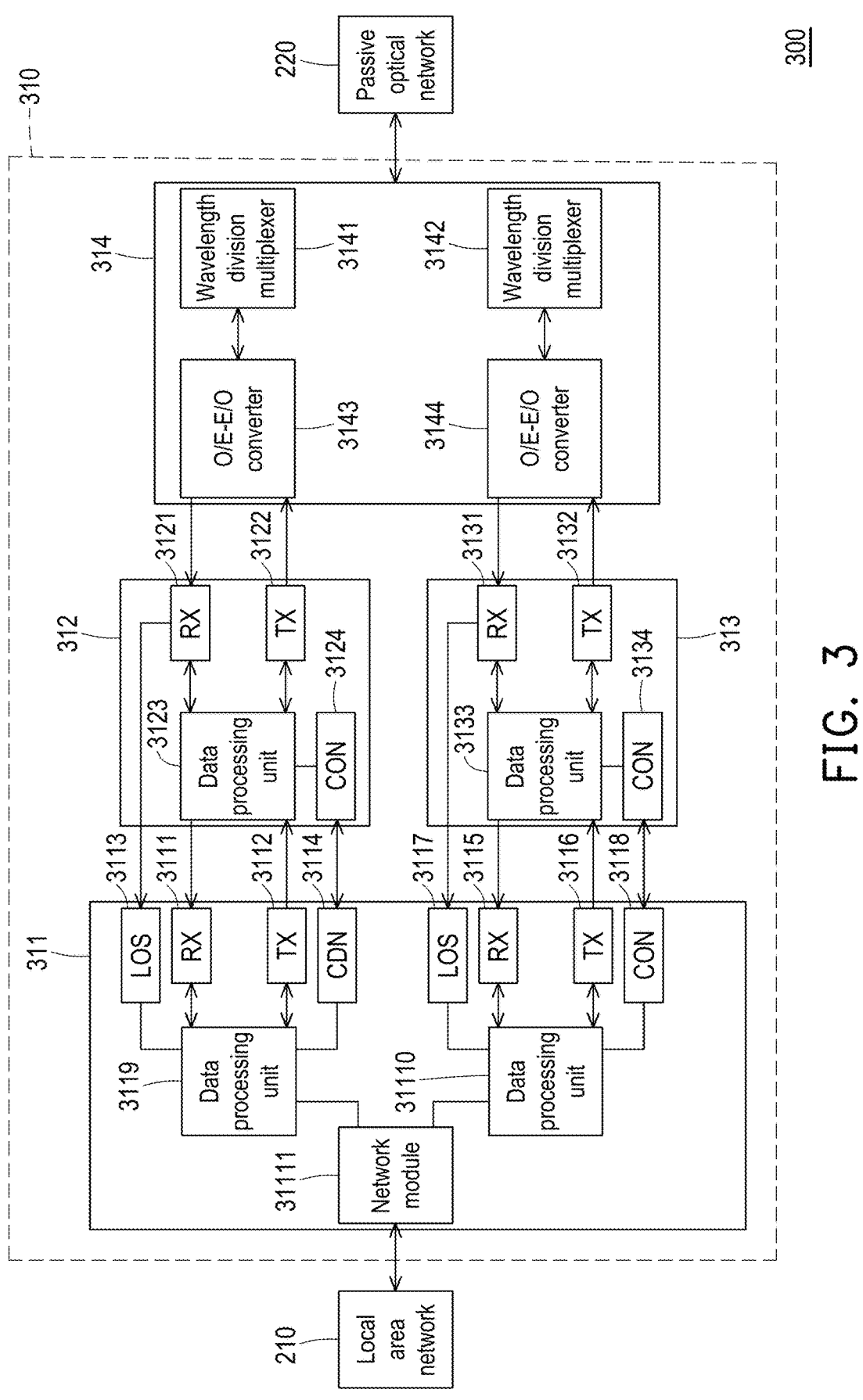
FIG. 3 is a schematic diagram of the communication device according to the first example embodiment of the disclosure.

FIG. 3 is a schematic diagram of the communication device according to the first example embodiment of the disclosure. Referring to FIG. 3, a communication system 300 includes a communication device 310, the local area network 210, and the passive optical network 220. The communication device 310 is connected to the local area network 210 and the passive optical network 220. In this embodiment, the communication device 310 includes a processor 311, a first laser driver (LD) 312, a second laser driver 313, and a light emitting and receiving component 314. The processor 311 is electrically connected to the first laser driver 312 and the second laser driver 313 and is connected to the local area network 210. The light emitting and receiving component 314 is electrically connected to the first laser driver 312 and the second laser driver 313 and is connected to the passive optical network 220.

In this embodiment, the processor 311 includes receiving terminals (RX) 3111, 3115, transmission terminals (TX) 3112, 3116, loss-of-signal terminals (LOS) 3113, 3117, control terminals (CON) 3114, 3118, data processing units 3119, 31110, and a network module 31111. The data processing unit 3119 is electrically connected to the receiving terminal 3111, the transmission terminal 3112, the loss-of-signal terminal 3113, the control terminal 3114, and the network module 31111. The data processing unit 31110 is electrically connected to the receiving terminal 3115, the transmission terminal 3116, the loss-of-signal terminal 3117, the control terminal 3118, and the network module 31111.

In this embodiment, the first laser driver 312 includes a receiving terminal 3121, a transmission terminal 3122, a data processing unit 3123, and a control terminal 3124. The data processing unit 3123 is electrically connected to the receiving terminal 3121, the transmission terminal 3122, and the control terminal 3124. In this embodiment, the second laser driver 313 includes the receiving terminal 3131, the transmission terminal 3132, the data processing unit 3133, and the control terminal 3134. The data processing unit 3133 is electrically connected to the receiving terminal 3131, the transmission terminal 3132, and the control terminal 3134. In this embodiment, the light emitting and receiving component 314 includes wavelength division multiplexers (WDM) 3141, 3142 and O/E-E/O converters 3143, 3144. The wavelength division multiplexer 3141 is connected to the O/E-E/O converter 3143. The wavelength division multiplexer 3142 is connected to the O/E-E/O converter 3144.

It should be noted that in this embodiment, the wavelength division multiplexer 3141 merely allows the optical signal of the first band to pass, in which the optical signal of the first band may, for example, refer to the uplink optical signal and the downlink optical signal of XGSPON. Moreover, the wavelength division multiplexer 3142 merely allows the optical signal of the second band to pass, in which the optical signal of the second band may, for example, refer to the uplink optical signal and the downlink optical signal of GPON. In other words, the light emitting and receiving component 314 may split the optical signals of different wavebands through the wavelength division multiplexers 3141 and 3142 and convert into corresponding electrical signals through the O/E-E/O converters 3143 and 3144 respectively.

In this embodiment, the wavelength division multiplexer 3141 may be used to receive the first uplink optical signal (for example, the uplink optical signal of XGSPON) from the O/E-E/O converter 3143 and send the first uplink optical signal to the passive optical network 220. The wavelength division multiplexer 3141 may be used to receive the first downlink optical signal (for example, the downlink optical signal of XGSPON) from the passive optical network 220 and send the first downlink optical signal to the O/E-E/O converter 3143. In this embodiment, the wavelength division multiplexer 3142 may be used to receive the second uplink optical signal (for example, the uplink optical signal of GPON) from the O/E-E/O converter 3144 and send the second uplink optical signal to the passive optical network 220. The wavelength division multiplexer 3142 may be used to receive the second downlink optical signal (for example, the downlink optical signal of GPON) from the passive optical network 220 and send the second downlink optical signal to the O/E-E/O converter 3144.

In this embodiment, the O/E-E/O converter 3143 of the light emitting and receiving component 314 is electrically connected to the receiving terminal 3121 and the transmission terminal 3122 of the first laser driver 312. The O/E-E/O converter 3144 of the light emitting and receiving component 314 is electrically connected to the receiving terminal 3131 and the transmission terminal 3132 of the second laser driver 313. The first laser driver 312 and the second laser driver 313 may be used to control the emission of laser diodes of the O/E-E/O converters 3143 and 3144 in the light emitting and receiving component 314 respectively and may be used to amplify the weak electrical signal generated from converting the optical signal to the electrical signal by the O/E-E/O converters 3143 and 3144 in the light emitting and receiving component 314. For example, the first laser driver 312 may include a first amplifier, and the first amplifier is configured to amplify a first uplink electrical signal and/or a first downlink electrical signal. The second laser driver 313 may include a second amplifier, and the second amplifier is configured to amplify a second uplink electrical signal and/or a second downlink electrical signal.

In this embodiment, the data processing unit 3123 of the first laser driver 312 is electrically connected to the receiving terminal 3111 and the transmission terminal 3112 of the processor 311. The receiving terminal 3121 of the first laser driver 312 is electrically connected to the loss-of-signal terminal 3113 of the processor 311. The control terminal 3124 of the first laser driver 312 is electrically connected to the control terminal 3114 of the processor 311.

In this embodiment, the data processing unit 3133 of the second laser driver 313 is electrically connected to the receiving terminal 3115 and the transmission terminal 3116 of the processor 311. The receiving terminal 3131 of the second laser driver 313 is electrically connected to the loss-of-signal terminal 3117 of the processor 311. The control terminal 3134 of the second laser driver 313 is electrically connected to the control terminal 3118 of the processor 311.

Specifically, when the passive optical network 220 provides the first downlink optical signal to the light emitting and receiving component 314, the first downlink optical signal may pass through the wavelength division multiplexer 3141 of the light emitting and receiving component 314 and be transmitted to the O/E-E/O converter 3143. The O/E-E/O converter 3143 may convert the first downlink optical signal into the first downlink electrical signal and send to the receiving terminal 3121 of the first laser driver 312. The data processing unit 3123 of the first laser driver 312 may receive the first downlink electrical signal from the receiving terminal 3121, further convert the first downlink electrical signal into another first downlink electrical signal, and send to the receiving terminal 3111 of the processor 311. The data processing unit 3119 of the processor 311 may perform further signal processing (communication signal processing) on another first downlink electrical signal to output the first downlink communication signal to the network module 31111 and output the first downlink communication signal to the local area network 210 through the network module 31111. The network module 31111 includes, for example, a related communication interface. The data processing unit 3119 of the processor 311 may be used to convert the first downlink communication signal into SerDes (Serializer/Deserializer) data format to transmit the first downlink communication signal to the local area network 210 through the differential line through the communication interface in the network module 31111, so that a transmission effect of high speed and long distance can be achieved.

It is worth noting that since the receiving terminal 3121 of the first laser driver 312 receives the first downlink electrical signal, the receiving terminal 3121 of the first laser driver 312 sends the loss-of-signal signal to the loss-of-signal terminal 3113 of the processor 311, so that the data processing unit 3119 may output the control signal to the control terminal 3134 of the second laser driver 313 through the control terminal 3118 of the processor 311 according to the loss-of-signal signal sent by the first laser driver 312, so that the second laser driver 313 is disabled, and the first laser driver 312 is enabled. In addition, since the receiving terminal 3131 of the second laser driver 313 does not receive the downlink electrical signal, the receiving terminal 3131 of the second laser driver 313 does not send the loss-of-signal signal.

Moreover, when the network module 31111 receives the first uplink communication signal from the local area network 210, the data processing unit 3119 of the processor 311 may perform further signal processing (communication signal processing) on the first uplink communication signal to output another first uplink communication signal to the transmission terminal 3112. The data processing unit 3123 of the first laser driver 312 may receive another first uplink communication signal and further convert another first uplink communication signal into the first uplink electrical signal. The data processing unit 3123 of the first laser driver 312 sends the first uplink electrical signal to the O/E-E/O converter 3143 of the light emitting and receiving component 314 through the transmitter 3122. The O/E-E/O converter 3143 of the light emitting and receiving component 314 may convert the first uplink electrical signal into the first uplink optical signal and send to the passive optical network 220.

In contrast, when the passive optical network 220 provides the second downlink optical signal to the light emitting and receiving component 314, the second downlink optical signal may pass through the wavelength division multiplexer 3142 of the light emitting and receiving component 314 and be transmitted to the O/E-E/O converter 3144. The O/E-E/O converter 3144 may convert the second downlink optical signal into the second downlink electrical signal and send to the receiving terminal 3131 of the second laser driver 313. The data processing unit 3133 of the second laser driver 313 may receive the second downlink electrical signal from the receiving terminal 3131, further convert the second downlink electrical signal into another second downlink electrical signal, and send to the receiving terminal 3115 of the processor 311. The data processing unit 31110 of the processor 311 may perform further signal processing (communication signal processing) on another second downlink electrical signal to output the second downlink communication signal to the network module 31111 and output the second downlink communication signal to the local area network 210 through the network module 31111. The data processing unit 31110 of the processor 311 may be used to convert the second downlink communication signal into SerDes data format to transmit the second downlink communication signal to the local area network 210 through the differential line through the communication interface in the network module 31111, so that a transmission effect of high speed and long distance can be achieved.

It is worth noting that since the receiving terminal 3131 of the second laser driver 313 receives the second downlink electrical signal, the receiving terminal 3131 of the second laser driver 313 sends the loss-of-signal signal to the loss-of-signal terminal 3117 of the processor 311, so that the data processing unit 31110 may output the control signal to the control terminal 3124 of the first laser driver 312 through the control terminal 3114 of the processor 311 according to the loss-of-signal signal sent by the second laser driver 313, so that the first laser driver 312 is disabled, and the second laser driver 313 is enabled. In addition, since the receiving terminal 3121 of the first laser driver 312 does not receive the downlink electrical signal, the receiving terminal 3121 of the first laser driver 312 does not send the loss-of-signal signal.

Moreover, when the network module 31111 receives the second uplink communication signal from the local area network 210, the data processing unit 31110 of the processor 311 may perform further signal processing (communication signal processing) on the second uplink communication signal to output another second uplink communication signal to the transmission terminal 3116. The data processing unit 3133 of the second laser driver 313 may receive another second uplink communication signal and further convert another second uplink communication signal into the second uplink electrical signal. The data processing unit 3133 of the second laser driver 313 sends the second uplink electrical signal to the O/E-E/O converter 3144 of the light emitting and receiving component 314 through the transmitter 3132. The O/E-E/O converter 3144 of the light emitting and receiving component 314 may convert the second uplink electrical signal into the second uplink optical signal and send to the passive optical network 220.

Therefore, the communication device 310 according to this example embodiment can effectively support the communication architecture of two types (such as GPON and XGSPON) of the passive optical network 220. Moreover, the communication device 310 according to this example embodiment can automatically disable the first laser driver 312 or the second laser driver 313 according to the loss-of-signal signal, so that a good signal transmission quality can be provided between the local area network 210 and the passive optical network 220.

Figure 4:
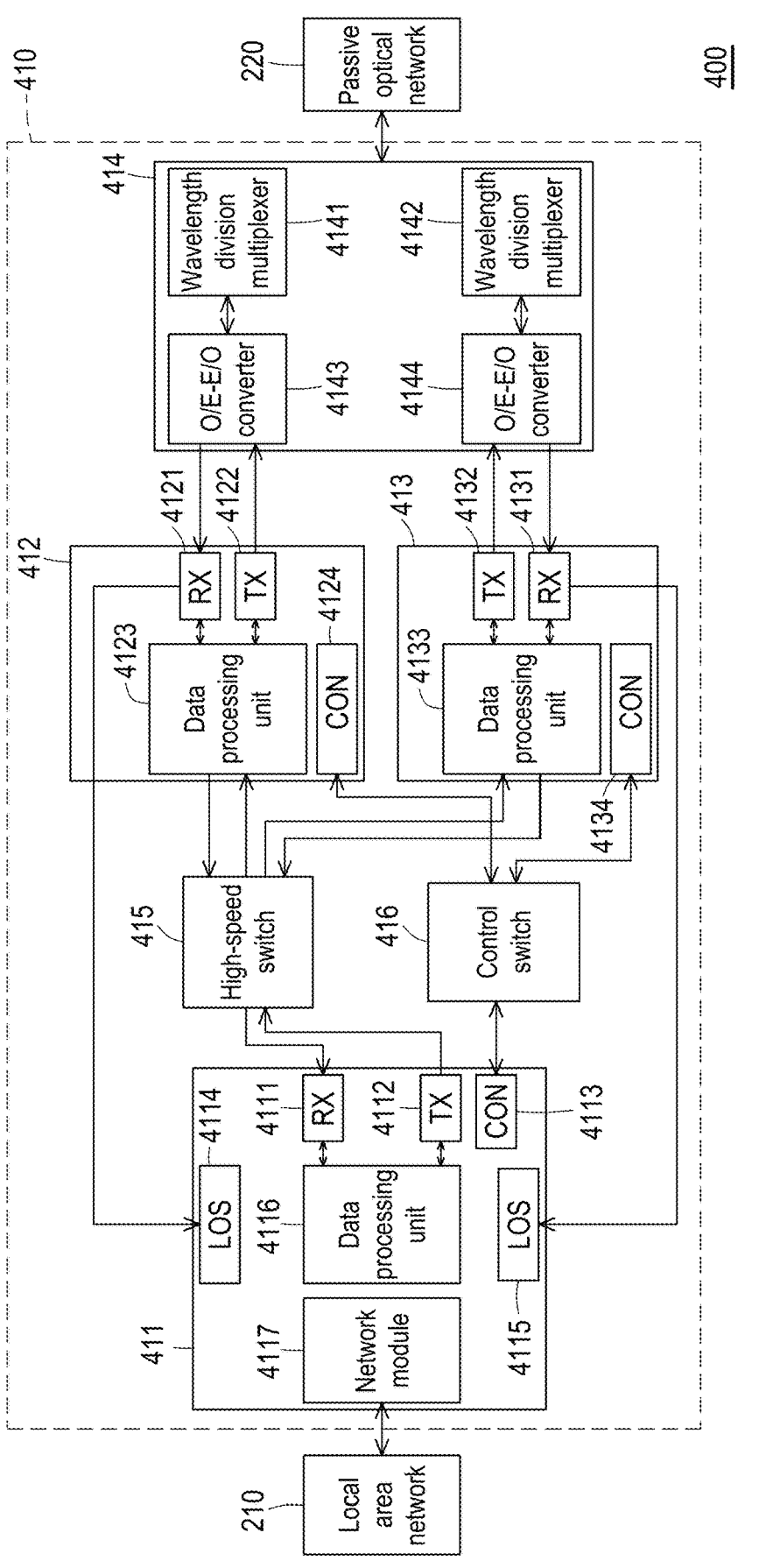
FIG. 4 is a schematic diagram of the communication device according to the second example embodiment of the disclosure.

FIG. 4 is a schematic diagram of the communication device according to the second example embodiment of the disclosure. Referring to FIG. 4, a communication system 400 includes a communication device 410, the local area network 210, and the passive optical network 220. The communication device 410 is connected to the local area network 210 and the passive optical network 220. In this embodiment, communication device 410 includes a processor 411, a first laser driver 412, a second laser driver 413, a light emitting and receiving component 414, a high-speed switch 415, and a control switch 416. The processor 411 is electrically connected to the first laser driver 412, the second laser driver 413, the high-speed switch 415, and the control switch 416 and is connected to the local area network 210. The high-speed switch 415 and the control switch 416 are electrically connected to the first laser driver 412 and the second laser driver 413. The light emitting and receiving component 414 is electrically connected to the first laser driver 412 and the second laser driver 413 and is connected to the passive optical network 220. In this embodiment, the high-speed switch 415 may be, for example, a SerDes switch. The control switch 416 may be, for example, a multiplexer/demultiplexer.

In this embodiment, the processor 411 includes a receiving terminal 4111, a transmission terminal 4112, a control terminal 4113, loss-of-signal terminals 4114, 4115, a data processing unit 4116, and a network module 4117. The receiving terminal 4111, the transmission terminal 4112, the control terminal 4113, the loss-of-signal terminal 4114 and 4115 may be respectively implemented by using multiple general-purpose input/output pins and/or specific function pins of the SoC. In addition, the processor 411 may further include Serial Peripheral Interface (SPI), Double Data Rate (DDR) interface, and USXGMII. The SPI may be electrically connected to the flash. The DDR interface may be electrically connected to the dynamic random-access memory (DRAM). The USXGMII may be electrically connected to the local area network 210.

In this embodiment, the data processing unit 4116 is electrically connected to the receiving terminal 4111, the transmission terminal 4112, the control terminal 4113, the loss-of-signal terminals 4114, 4115, the data processing unit 4116, and the network module 4117. In this embodiment, the first laser driver 412 includes a receiving terminal 4121, a transmission terminal 4122, a data processing unit 4123, and a control terminal 4124. The data processing unit 4123 is electrically connected to the receiving terminal 4121, the transmission terminal 4122, and the control terminal 4124. In this embodiment, the second laser driver 413 includes a receiving terminal 4131, a transmission terminal 4132, a data processing unit 4133, and a control terminal 4134. The data processing unit 4133 is electrically connected to the receiving terminal 4131, the transmission terminal 4132, and the control terminal 4134. In this embodiment, the light emitting and receiving component 414 includes wavelength division multiplexers 4141 and 4142 and O/E-E/O converters 4143 and 4144. The wavelength division multiplexer 4141 is connected to the O/E-E/O converter 4143. The wavelength division multiplexer 4142 is connected to the O/E-E/O converter 4144.

It should be noted that in this embodiment, the wavelength division multiplexer 4141 merely allows the optical signal of the first band to pass, in which the optical signal of the first band may, for example, refer to the uplink optical signal and the downlink optical signal of XGSPON. Moreover, the wavelength division multiplexer 4142 merely allows the optical signal of the second band to pass, in which the optical signal of the second band may, for example, refer to the uplink optical signal and the downlink optical signal of GPON. In other words, the light emitting and receiving component 414 may split the optical signals of different wavebands through the wavelength division multiplexers 4141 and 4142 and convert into corresponding electrical signals through the O/E-E/O converters 4143 and 4144 respectively.

In this embodiment, the wavelength division multiplexer 4141 may be used to receive the first uplink optical signal (for example, the uplink optical signal of XGSPON) from the O/E-E/O converter 4143 and send the first uplink optical signal to the passive optical network 220. The wavelength division multiplexer 4141 may be used to receive the first downlink optical signal (for example, the downlink optical signal of XGSPON) from the passive optical network 220 and send the first downlink optical signal to the O/E-E/O converter 4143. In this embodiment, the wavelength division multiplexer 4142 may be used to receive the second uplink optical signal (for example, the uplink optical signal of GPON) from the O/E-E/O converter 4144 and send the second uplink optical signal to the passive optical network 220. The wavelength division multiplexer 4142 may be used to receive the second downlink optical signal (for example, the downlink optical signal of GPON) from the passive optical network 220 and send the second downlink optical signal to the O/E-E/O converter 4144.

In this embodiment, the O/E-E/O converter 4143 of the light emitting and receiving component 414 is electrically connected to the receiving terminal 4121 and the transmission terminal 4122 of the first laser driver 412. The O/E-E/O converter 4144 of the light emitting and receiving component 414 is electrically connected to the receiving terminal 4131 and the transmission terminal 4132 of the second laser driver 413.

In this embodiment, the data processing unit 4123 of the first laser driver 412 is electrically connected to the high-speed switch 415. The high-speed switch 415 is electrically connected to the receiving terminal 4111 and the transmission terminal 4112 of the processor 411. The receiving terminal 4121 of the first laser driver 412 is electrically connected to the loss-of-signal terminal 4114 of the processor 411. The control terminal 4124 of the first laser driver 412 is electrically connected to the control switch 416. The control switch 416 is electrically connected to the control terminal 4113 of the processor 411.

In this embodiment, the data processing unit 4133 of the second laser driver 413 is electrically connected to the high-speed switch 415. The high-speed switch 415 is electrically connected to the receiving terminal 4111 and the transmission terminal 4112 of the processor 411. The receiving terminal 4131 of the second laser driver 413 is electrically connected to the loss-of-signal terminal 4115 of the processor 411. The control terminal 4134 of the second laser driver 413 is electrically connected to the control switch 416. The control switch 416 is electrically connected to the control terminal 4113 of the processor 411.

Specifically, when the passive optical network 220 provides the first downlink optical signal to the light emitting and receiving component 414, the first downlink optical signal may pass through the wavelength division multiplexer 4141 of the light emitting and receiving component 414 and be transmitted to the O/E-E/O converter 4143. The O/E-E/O converter 4143 may convert the first downlink optical signal into the first downlink electrical signal and send to the receiving terminal 4121 of the first laser driver 412. The data processing unit 4123 of the first laser driver 412 may receive the first downlink electrical signal from the receiving terminal 4121, further convert the first downlink electrical signal into another first downlink electrical signal, and send to the high-speed switch 415. The high-speed switch 415 may be switched to output another first downlink electrical signal provided by the first laser driver 412 to the receiving terminal 4111 of the processor 411. The data processing unit 4116 of the processor 411 may perform further signal processing (communication signal processing) on another first downlink electrical signal to output the first downlink communication signal to the network module 4117 and output the first downlink communication signal to the local area network 210 through the network module 4117.

It is worth noting that since the receiving terminal 4121 of the first laser driver 412 receives the first downlink electrical signal, the receiving terminal 4121 of the first laser driver 412 sends the loss-of-signal signal to the loss-of-signal terminal 4114 of the processor 411, so that the data processing unit 4116 may output the control signal to the control switch 416 through the control terminal 4113 of the processor 411 according to the loss-of-signal signal sent by the first laser driver 412. The control switch 416 may be switched to output the control signal to the control terminal 4134 of the second laser driver 413, so that the second laser driver 413 is disabled, and the first laser driver 412 is enabled. In addition, since the receiving terminal 4131 of the second laser driver 413 does not receive the downlink electrical signal, the receiving terminal 4131 of the second laser driver 413 does not send the loss-of-signal signal.

Moreover, when the network module 4117 receives the first uplink communication signal from the local area network 210, the data processing unit 4116 of the processor 411 may perform further signal processing (communication signal processing) on the first uplink communication signal to output another first uplink communication signal to the transmission terminal 4112 and send to the high-speed switch 415. The high-speed switch 415 may be switched to output another first uplink communication signal to the data processing unit 4123 of the first laser driver 412. The data processing unit 4123 of the first laser driver 412 may receive another first uplink communication signal and further convert another first uplink communication signal into the first uplink electrical signal. The data processing unit 4123 of the first laser driver 412 sends the first uplink electrical signal to the O/E-E/O converter 4143 of the light emitting and receiving component 414 through the transmission terminal 4122. The O/E-E/O converter 4143 of the light emitting and receiving component 414 may convert the first uplink electrical signal into the first uplink optical signal and send to the passive optical network 220.

In contrast, when the passive optical network 220 provides the second downlink optical signal to the light emitting and receiving component 414, the second downlink optical signal may pass through the wavelength division multiplexer 4142 of the light emitting and receiving component 414 and be transmitted to the O/E-E/O converter 4144. The O/E-E/O converter 4144 may convert the second downlink optical signal into the second downlink electrical signal and send to the receiving terminal 4131 of the second laser driver 413. The data processing unit 4133 of the second laser driver 413 may receive the second downlink electrical signal from the receiving terminal 4131, further convert the second downlink electrical signal into another second downlink electrical signal, and send to the high-speed switch 415. The high-speed switch 415 may be switched to output another second downlink electrical signal provided by the second laser driver 413 to the receiving terminal 4111 of the processor 411. The data processing unit 4116 of the processor 411 may perform further signal processing (communication signal processing) on another second downlink electrical signal to output the second downlink communication signal to the network module 4117 and output the second downlink communication signal to the local area network 210 through the network module 4117.

It is worth noting that since the receiving terminal 4131 of the second laser driver 413 receives the second downlink electrical signal, the receiving terminal 4131 of the second laser driver 413 sends the loss-of-signal signal to the loss-of-signal terminal 4115 of the processor 411, so that the data processing unit 4116 may output the control signal to the control switch 416 through the control terminal 4113 of the processor 411 according to the loss-of-signal signal sent by the second laser driver 413. The control switch 416 may be switched to output the control signal to the control terminal 4124 of the first laser driver 412, so that the first laser driver 412 is disabled, and the second laser driver 413 is enabled. In addition, since the receiving terminal 4121 of the first laser driver 412 does not receive the downlink electrical signal, the receiving terminal 4121 of the first laser driver 412 does not send the loss-of-signal signal.

Moreover, when the network module 4117 receives the second uplink communication signal from the local area network 210, the data processing unit 4116 of the processor 411 may perform further signal processing (communication signal processing) on the second uplink communication signal to output another second uplink communication signal to the transmission terminal 4112 and send to the high-speed switch 415. The high-speed switch 415 may be switched to output another second uplink communication signal to the data processing unit 4133 of the second laser driver 413. The data processing unit 4133 of the second laser driver 413 may receive another second uplink communication signal and further convert another second uplink communication signal into the second uplink electrical signal. The data processing unit 4133 of the second laser driver 413 sends the second uplink electrical signal to the O/E-E/O converter 4144 of the light emitting and receiving component 414 through the transmission terminal 4132. The O/E-E/O converter 4144 of the light emitting and receiving component 414 may convert the second uplink electrical signal into the second uplink optical signal and send to the passive optical network 220.

Therefore, the communication device 410 according to this example embodiment can effectively support the communication architecture of two types (such as GPON and XGSPON) of the passive optical network 220. Moreover, the communication device 410 according to this example embodiment can automatically disable the first laser driver 412 or the second laser driver 413 according to the loss-of-signal signal, so that a good signal transmission quality can be provided between the local area network 210 and the passive optical network 220.

In summary, the communication device and the communication device method according to the disclosure can support sending and receiving optical signals transmitted by two types (such as GPON and XGSPON) of passive optical networks by designing two sets of O/E-E/O converters and wavelength division multiplexers in the light emitting and receiving component. Moreover, the communication device according to the disclosure can also generate a corresponding loss-of-signal signal according to whether the first laser driver and the second laser driver send and receive optical signals, so as to effectively disable one of the first laser driver and the second laser driver. In this way, the communication device according to the disclosure can not only support the communication architecture of two types of passive optical networks, but also have a good signal transmission quality.

Although the disclosure has been disclosed above in terms of embodiment, the embodiments are not intended to limit the disclosure. Persons with ordinary knowledge in the technical field may make some modifications and modifications without departing from the spirit and scope of the disclosure. Therefore, the protection scope of the disclosure shall be determined by the appended claims.

What is claimed is:
1. A communication device, comprising:
a first laser driver;
a second laser driver;
a light emitting and receiving component connected to a passive optical network to send and/or receive an optical signal and electrically connected to the first laser driver and the second laser driver; and
a processor electrically connected to the first laser driver and the second laser driver,
wherein the light emitting and receiving component converts the optical signal into a first electrical signal and output the first electrical signal to one of the first laser driver and the second laser driver,
wherein the one of the first laser driver and the second laser driver converts the first electrical signal into a second electrical signal and outputs the second electrical signal to the processor,
wherein the processor disables the other one of the first laser driver and the second laser driver.
2. The communication device as claimed in claim 1, wherein the processor disables the other one of the first laser driver and the second laser driver according to a received loss-of-signal signal sent by the one of the first laser driver and the second laser driver.
3. The communication device as claimed in claim 2, further comprising:
a control switch electrically connected to the first laser driver, the second laser driver, and the processor,
wherein in response to the processor receiving the loss-of-signal signal, the processor outputs a control signal to the control switch, so as to enable the one of the first laser driver and the second laser driver through the control switch and to disable the other one of the first laser driver and the second laser driver.
4. The communication device as claimed in claim 2, wherein the first laser driver and the second laser driver each comprise a first signal receiving terminal,
wherein the other one of the first laser driver and the second laser driver does not send the loss-of-signal signal to the processor in response to the first signal receiving terminal not receiving the optical signal.
5. The communication device as claimed in claim 1, further comprising:
a high-speed switch electrically connected to the first laser driver, the second laser driver, and the processor,
wherein the high-speed switch is adapted to be switched to output an electrical signal provided by the first laser driver or the second laser driver to the processor.
6. The communication device as claimed in claim 1, wherein the light emitting and receiving component comprises:
a first wavelength division multiplexer adapted to receive a first downlink optical signal from the passive optical network and adapted to output a first uplink optical signal to the passive optical network; and a second wavelength division multiplexer adapted to receive a second downlink optical signal from the passive optical network and adapted to output a second uplink optical signal to the passive optical network.

7. The communication device as claimed in claim 6, wherein the first uplink optical signal and the second uplink optical signal have different wavelengths, and the first downlink optical signal and the second downlink optical signal have different wavelengths.

8. The communication device as claimed in claim 6, wherein the light emitting and receiving component further comprises:

a first O/E-E/O converter connected to the first wavelength division multiplexer and electrically connected to the first laser driver, wherein the first O/E-E/O converter is adapted to convert the first downlink optical signal output by the first wavelength division multiplexer into a first downlink electrical signal and output to the first laser driver, and the first O/E-E/O converter is adapted to convert a first uplink electrical signal output by the first laser driver into the first uplink optical signal and output to the first wavelength division multiplexer.

9. The communication device as claimed in claim 8, wherein the light emitting and receiving component further comprises:

a second O/E-E/O converter connected to the second wavelength division multiplexer and electrically connected to the second laser driver, wherein the second O/E-E/O converter is adapted to convert the second downlink optical signal output by the second wavelength division multiplexer into a second downlink electrical signal and output to the second laser driver, and the second O/E-E/O converter is adapted to convert a second uplink electrical signal output by the second laser driver into the second uplink optical signal and output to the second wavelength division multiplexer.

10. The communication device as claimed in claim 1, wherein the processor performs signal processing on the second electrical signal to output a communication signal to a local area network.

11. A communication device method, comprising:

sending and/or receiving an optical signal from a passive optical network through a light emitting and receiving component;

converting the optical signal into a first electrical signal through the light emitting and receiving component and outputting the first electrical signal to one of a first laser driver and a second laser driver;

converting the first electrical signal into a second electrical signal through the one of the first laser driver and the second laser driver and outputting the second electrical signal to a processor; and disabling the other one of the first laser driver and the second laser driver through the processor.

12. The communication device method as claimed in claim 11, wherein disabling the other one of the first laser driver and the second laser driver comprises:

disabling the other one of the first laser driver and the second laser driver according to a received loss-of-signal signal sent by the one of the first laser driver and the second laser driver through the processor.

13. The communication device method as claimed in claim 12, wherein disabling the other one of the first laser driver and the second laser driver further comprises:

in response to the processor receiving the loss-of-signal signal, outputting a control signal to the control switch through the processor, so as to enable the one of the first laser driver and the second laser driver through the control switch and to disable the other one of the first laser driver and the second laser driver.

14. The communication device method as claimed in claim 12, further comprising:

not sending the loss-of-signal signal to the processor in response to a first signal receiving terminal not receiving the optical signal through the other one of the first laser driver and the second laser driver.

15. The communication device method as claimed in claim 11, wherein outputting the second electrical signal to the processor comprises:

outputting an electrical signal provided by the first laser driver or the second laser driver to the processor through switching of the high-speed switch.

16. The communication device method as claimed in claim 11, wherein sending and/or receiving the optical signal from the passive optical network through the light emitting and receiving component comprises:

receiving a first downlink optical signal from the passive optical network through a first wavelength division multiplexer of the light emitting and receiving component and outputting a first uplink optical signal to the passive optical network; or receiving a second downlink optical signal from the passive optical network through a second wavelength division multiplexer of the light emitting and receiving component and outputting a second uplink optical signal to the passive optical network.

17. The communication device method as claimed in claim 16, wherein the first uplink optical signal and the second uplink optical signal have different wavelengths, and the first downlink optical signal and the second downlink optical signal have different wavelengths.

18. The communication device method as claimed in claim 16, wherein receiving the first downlink optical signal from the passive optical network through the first wavelength division multiplexer of the light emitting and receiving component and outputting the first uplink optical signal to the passive optical network further comprises:

converting the first downlink optical signal output by the first wavelength division multiplexer into a first downlink electrical signal through a first O/E-E/O converter of the light emitting and receiving component and outputting to the first laser driver; and converting a first uplink electrical signal output by the first laser driver into the first uplink optical signal through the first O/E-E/O converter of the light emitting and receiving component and outputting to the first wavelength division multiplexer.

19. The communication device method as claimed in claim 16, wherein receiving the second downlink optical signal from the passive optical network through the second wavelength division multiplexer of the light emitting and receiving component and outputting the second uplink optical signal to the passive optical network further comprises:

converting the second downlink optical signal output by the second wavelength division multiplexer into a second downlink electrical signal through a second O/E-E/O converter of the light emitting and receiving component and outputting to the second laser driver; and converting a second uplink electrical signal output by the second laser driver into the second uplink optical signal through the second O/E-E/O converter of the light emitting and receiving component and outputting to the second wavelength division multiplexer.

20. The communication device method as claimed in claim 11, further comprising:

performing signal processing on the second electrical signal through the processor to output a communication signal to a local area network.

\* \* \* \* \*